(12) United States Patent
Liang et al.

(10) Patent No.: US 11,030,998 B2
(45) Date of Patent: Jun. 8, 2021

(54) ACOUSTIC MODEL TRAINING METHOD, SPEECH RECOGNITION METHOD, APPARATUS, DEVICE AND MEDIUM

(71) Applicant: Ping An Technology (Shenzhen) Co., Ltd., Guangdong (CN)

(72) Inventors: Hao Liang, Guangdong (CN); Jianzong Wang, Guangdong (CN); Ning Cheng, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 407 days.

(21) Appl. No.: 16/097,850

(22) PCT Filed: Aug. 31, 2017

(86) PCT No.: PCT/CN2017/099825
§ 371 (c)(1),
(2) Date: Oct. 31, 2018

(87) PCT Pub. No.: WO2019/019252
PCT Pub. Date: Jan. 31, 2019

(65) Prior Publication Data
US 2021/0125603 A1   Apr. 29, 2021

(30) Foreign Application Priority Data
Jul. 28, 2017   (CN) .......................... 201710627480.8

(51) Int. Cl.
*G10L 15/14*    (2006.01)
*G10L 15/02*    (2006.01)
*G10L 15/16*    (2006.01)

(52) U.S. Cl.
CPC ............ *G10L 15/144* (2013.01); *G10L 15/02* (2013.01); *G10L 15/16* (2013.01); *G10L 2015/025* (2013.01)

(58) Field of Classification Search
CPC ........ G10L 15/02; G10L 15/16; G10L 15/144
(Continued)

(56) References Cited

U.S. PATENT DOCUMENTS 7,089,178 B2 *   8/2006   Garudadri ............... G10L 15/02
                                                                        704/202
8,442,821 B1     5/2013   Vanhoucke
(Continued)

FOREIGN PATENT DOCUMENTS

CN          103117060 A      5/2013
CN          104575504 A      4/2015
(Continued)

OTHER PUBLICATIONS

Farheen Fauziya et al., A Comparative Study of Phoneme Recognition using GMM-HMM and ANN based Acoustic Modeling, International Journal of Computer Applications, Jul. 2014, pp. 12-16, vol. 98, No. 6.
(Continued)

*Primary Examiner* — Susan I McFadden

(57) ABSTRACT

An acoustic model training method, a speech recognition method, an apparatus, a device and a medium. The acoustic model training method comprises: performing feature extraction on a training speech signal to obtain an audio feature sequence; training the audio feature sequence by a phoneme mixed Gaussian Model-Hidden Markov Model to obtain a phoneme feature sequence; and training the phoneme feature sequence by a Deep Neural Net-Hidden Markov Model-sequence training model to obtain a target acoustic model. The acoustic model training method can
(Continued)

effectively save time required for an acoustic model training, improve the training efficiency, and ensure the recognition efficiency.

12 Claims, 5 Drawing Sheets

(58) Field of Classification Search
 USPC .......................................................... 704/232
 See application file for complete search history.

(56) References Cited

U.S. PATENT DOCUMENTS

| | | | | |
|---|---|---|---|---|
| 9,466,289 | B2* | 10/2016 | Lu | ........................ G10L 15/063 |
| 9,679,556 | B2* | 6/2017 | Tyagi | .................... G10L 15/063 |
| 9,972,306 | B2* | 5/2018 | Tyagi | .................... G10L 15/144 |
| 10,008,197 | B2* | 6/2018 | Hayakawa | ............ G10L 15/142 |
| 10,157,610 | B2* | 12/2018 | Tyagi | .................... G10L 15/063 |
| 10,529,317 | B2* | 1/2020 | Lee | ......................... G10L 15/02 |
| 10,699,699 | B2* | 6/2020 | Wu | ....................... G10L 15/063 |
| 2012/0065976 | A1 | 3/2012 | Deng et al. | |
| 2014/0236600 | A1 | 8/2014 | Lu et al. | |
| 2016/0240190 | A1 | 8/2016 | Lee et al. | |
| 2016/0307565 | A1 | 10/2016 | Liu et al. | |

FOREIGN PATENT DOCUMENTS

| | | |
|---|---|---|
| CN | 105869624 A | 8/2016 |
| WO | 2016165120 A1 | 10/2016 |

OTHER PUBLICATIONS

Sharada C. Sajjan et al., Speech Recognition Using Monophone and Triphone Based Continuous Density Hidden Markov Models, IJRSI, Nov. 2015, pp. 30-35, vol. 2, Issue 11.

* cited by examiner

ACOUSTIC MODEL TRAINING METHOD, SPEECH RECOGNITION METHOD, APPARATUS, DEVICE AND MEDIUM

This patent application is based on the Chinese Patent Application No. 201710627480.8, entitled "Acoustic Model Training Method, Speech Recognition Method, Apparatus, Device and Medium", which is filed on Jul. 28, 2017, and claims its priority.

FIELD OF THE INVENTION

The present application relates to a technical field of speech recognition, and more particularly relates to an acoustic model training method, a speech recognition method, an apparatus, a device and a medium.

BACKGROUND OF THE INVENTION

Speech recognition technology, also known as Automatic Speech Recognition (ASR), is a technology that enables a machine to convert a speech signal into a text signal through recognition and understanding, and is an important branch of modern artificial intelligence development. In a traditional speech recognition process, an acoustic model based on and trained by a mixed Gaussian Model (GMM) is configured for speech recognition. With development of a deep neural network technology, the acoustic model based on Deep Neural Net (DNN) can be configured to identify accuracy of speech recognition. A DNN acoustic model adopts a supervised learning method, and combines text content information to mine a more appropriate feature set from original data, so as to well express the speech signal and improve a recognition effect under a real scene.

A training process of a current GMM acoustic model or the DNN acoustic model adopts a frame-level training method, and an original speech signal is firstly framed, so that a non-stationary original speech signal is converted into an interval stationary signal, and then a sequence output of maximum a posteriori (MAP) of a frame is obtained. Since the speech signal is a kind of sequence information, a purpose of speech recognition is ultimately to deal with a problem of sequence classification. Currently, sequence training is provided in a Deep Neural Net-Hidden Markov Model (DNN-HMM) acoustic model, the sequence training is to directly perform sequence-level secondary training on candidate sequences outputted by DNN-HMM acoustic model training, which means that, to consider the MAP of an entire sentence instead of the MAP of each frame in the sentence, then context relationships between words and words in a sentence can be utilized to a greater extent, so that it can output more accurate speech recognition results than the DNN acoustic model.

However, current sequence training needs to pre-train the DNN-HMM acoustic model, and then train candidate paths outputted by the DNN-HMM acoustic model. The training process may be based on candidate paths that may be generated by all training data, but not just candidate paths for the to-be-identified sentence. Therefore, training time of the sequence training is too long, which is almost twice the length of DNN training time, making the current acoustic model training time is too long. In a current speech recognition process, it is necessary to firstly process a current DNN-HMM acoustic model, then output candidate sequences and perform secondary training at the sequence level, resulting in low efficiency and long time in the recognition process.

SUMMARY OF THE INVENTION

Embodiments of the present invention provides an acoustic model training method, an apparatus, a device and a medium to solve the problem that current acoustic model training time is too long.

Embodiments of the present invention provide a speech recognition method, an apparatus, a device and a medium to solve the problem that a current speech recognition process is inefficient.

In a first aspect, an embodiment of the present invention provides an acoustic model training method, comprising:

performing feature extraction on a training speech signal to obtain an audio feature sequence;

Training the audio feature sequence by a phoneme mixed Gaussian Model-Hidden Markov Model to obtain a phoneme feature sequence;

Training the phoneme feature sequence by a Deep Neural Net-Hidden Markov Model-sequence training model to obtain a target acoustic model.

In a second aspect, an embodiment of the present invention provides a speech recognition method, comprising:

Recognizing an original voice signal by using the target acoustic model obtained by the acoustic model training method, and acquiring a current voiceprint feature signal, the original voice signal comprises a user ID;

Obtaining a pre-stored voiceprint feature signal corresponding to the user ID;

Determining whether the current voiceprint feature signal and the pre-stored voiceprint feature signal correspond to a same user, and obtaining a determination result.

In a third aspect, an embodiment of the present invention provides an acoustic model training apparatus, comprising:

An audio feature sequence obtaining module configured to perform feature extraction from a training voice signal to obtain an audio feature sequence;

A phoneme feature sequence obtaining module configured to perform training on the audio feature sequence by using a phoneme mixed Gaussian Model-Hidden Markov Model to obtain a phoneme feature sequence;

A target acoustic model obtaining module configured to train the phoneme feature sequence by using a Deep Neural Net-Hidden Markov Model-sequence training model to obtain a target acoustic model.

In a fourth aspect, an embodiment of the present invention provides a speech recognition apparatus, comprising:

A current voiceprint obtaining module configured to recognize an original voice signal by using the target acoustic model obtained by the acoustic model training method, and acquire a current voiceprint feature signal, the original voice signal comprises a user ID;

A pre-stored voiceprint obtaining module configured to obtain a pre-stored voiceprint feature signal corresponding to the user ID;

A voiceprint feature comparison module configured to determine whether the current voiceprint feature signal and the pre-stored voiceprint feature signal correspond to a same user, and obtain a determination result.

In a fifth aspect, an embodiment of the present invention provides a terminal device, comprising a memory, a processor, and a computer program stored in the memory and operable on the processor, the processor performs the following steps when executing the computer program:

performing feature extraction on a training speech signal to obtain an audio feature sequence;

Training the audio feature sequence by a phoneme mixed Gaussian Model-Hidden Markov Model to obtain a phoneme feature sequence;

Training the phoneme feature sequence by a Deep Neural Net-Hidden Markov Model-sequence training model to obtain a target acoustic model.

In a sixth aspect, an embodiment of the present invention provides a terminal device comprising a memory, a processor, and a computer program stored in the memory and operable on the processor, the processor performs following steps when executing the computer program:

Recognizing an original voice signal by using the target acoustic model obtained by the acoustic model training method, and acquiring a current voiceprint feature signal, the original voice signal comprises a user ID;

Obtaining a pre-stored voiceprint feature signal corresponding to the user ID;

Determining whether the current voiceprint feature signal and the pre-stored voiceprint feature signal correspond to a same user, and obtaining a determination result.

In a seventh aspect, an embodiment of the present invention provides a computer readable storage medium, the computer readable storage medium stores a computer program, and when the computer program is executed by the processor, the following steps are performed:

performing feature extraction on a training speech signal to obtain an audio feature sequence;

Training the audio feature sequence by a phoneme mixed Gaussian Model-Hidden Markov Model to obtain a phoneme feature sequence;

Training the phoneme feature sequence by a Deep Neural Net-Hidden Markov Model-sequence training model to obtain a target acoustic model.

In an eighth aspect, an embodiment of the present invention provides a computer readable storage medium, the computer readable storage medium stores a computer program, and when the computer program is executed by the processor, the following steps are performed:

Recognizing an original voice signal by using the target acoustic model obtained by the acoustic model training method, and obtaining a current voiceprint feature signal, the original voice signal comprises a user ID;

Obtaining a pre-stored voiceprint feature signal corresponding to the user ID;

Determining whether the current voiceprint feature signal and the pre-stored voiceprint feature signal correspond to a same user, and obtaining a determination result.

In the acoustic model training method, the apparatus, the device and the medium provided by the embodiments of the present invention, the audio feature sequence acquired from the training speech signal can be converted into the phoneme feature sequence by using the phoneme mixed Gaussian Model-Hidden Markov Model training, thereby improving efficiency of acoustic model training and saving training time. Finally, applying the Deep Neural Net-Hidden Markov Model-sequence training model to train the phoneme feature sequence, effect of deep neural network model-Hidden Markov Model training and sequence training can be realized only by one training, so as to greatly reduce required training time and achieve better recognition effect than deep neural network model-Hidden Markov Model training.

In the speech recognition method, the apparatus, the device and the medium provided by the embodiments of the present invention, the current voiceprint feature signal corresponding to the user ID is obtained by using the target acoustic model, it has the advantages of high recognition efficiency and high accuracy. Then, by comparing the current voiceprint feature signal with a corresponding pre-stored voiceprint feature signal to identify whether they belong to the same user, so as to achieve a purpose of quickly identifying the user.

BRIEF DESCRIPTION OF THE DRAWINGS

The present invention will be further described below in conjunction with accompanying drawings and embodiments, in the accompanying drawings.

DETAILED DESCRIPTION OF THE PREFERRED EMBODIMENT

To make a technical feature, objective and effect of the present application be understood more clearly, now a specific implementation of the present application is described in detail with reference to accompanying drawings and embodiments to show characteristics and advantages of the present invention.

First Embodiment

Figure 1:
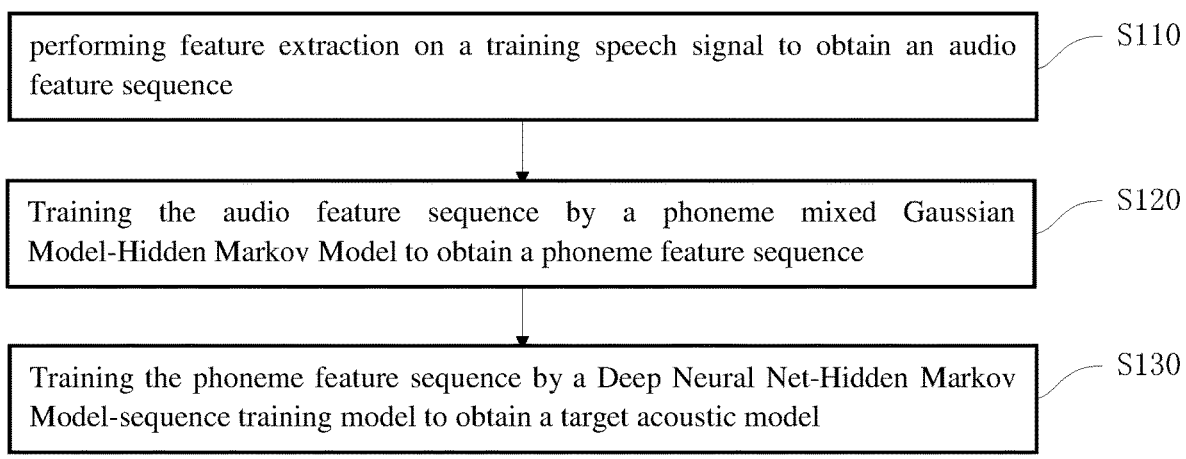
FIG. 1 is a flow chart of an acoustic model training method in a first embodiment of the present invention.

FIG. 1 shows a flow chart of the acoustic model training method in this embodiment. The acoustic model training method can be applied to financial institutions such as banks, securities, insurance or other institutions that need to perform speech recognition, so as to utilize a trained target acoustic model for speech recognition to achieve artificial intelligence. As shown in FIG. 1, the acoustic model training method comprises the following steps:

S110: performing feature extraction on a training speech signal to obtain an audio feature sequence.

Therein the training speech signal is an original speech configured to perform acoustic model training, and the original speech may be a voice signal in way, mp3 or other format. Since the acoustic model training is based on feature sequences after feature extraction performed on the training speech signal, instead of directly training on the original speech signal, it is necessary to firstly extract a feature of the training speech signal and convert it into an audio feature sequence.

S120: Training the audio feature sequence by a phoneme mixed Gaussian Model-Hidden Markov Model to obtain a phoneme feature sequence.

Therein the phoneme mixed Gaussian Model-Hidden Markov Model is a model for converting an audio feature sequence into a phoneme feature sequence. Both the current GMM acoustic model and the DNN acoustic model directly train the audio feature sequence. Direct training of the audio feature sequence is based on frame level training, mainly considering the MAP of an entire sentence instead the MAP of each sentence to be recognized, affecting the accuracy of speech recognition. In this embodiment, the audio feature sequence is first converted into the phoneme feature sequence by using a phoneme mixed Gaussian Model-Hidden Markov Model, and then the acoustic model training is performed based on the phoneme feature sequence, so that it can be recognized based on MAP of each frame in the sentence to be recognized to improve accuracy of speech recognition.

S130: Training the phoneme feature sequence by a Deep Neural Net-Hidden Markov Model-sequence training model to obtain a target acoustic model.

Therein the Deep Neural Net-Hidden Markov Model-sequence training model (hereinafter referred to as DNN-HMM-sequence training model). The phoneme feature sequence is trained by the DNN-HMM-sequence training model, and the training process is based on a candidate path of the sentence to be recognized. It is not necessary to train candidate paths corresponding to all the training speech signals, so that sequence training time is greatly reduced.

In this embodiment, a data structure stored in the candidate path is called a word lattice; the DNN-HMM-sequence training model can be applied to the sequence training in which the word lattice disappears by constructing a new recognition network, so that when the target acoustic model is trained, only the candidate path of the sentence to be recognized is trained. There is no need to consider candidate paths corresponding to all training speech signals, so as to improve training efficiency of the acoustic model. The recognition network is a graph model similar to a speech recognition decoding network, and a building unit of the speech recognition decoding network is replaced with a state-level DNN-HMM sequence training model to build the recognition network.

In the acoustic model training method provided by the embodiment, a feature is extracted by the training speech signal to be converted into an audio feature sequence capable of being performed by acoustic model training, so as to ensure a smooth progress of the acoustic model training. The phoneme mixed Gaussian Model-Hidden Markov Model is configured to train the audio feature sequence to obtain the phoneme feature sequence, which improves efficiency of the target acoustic model training and saves training time. Finally, the phoneme feature sequence is trained by the Deep Neural Net-Hidden Markov Model-sequence training Model. It is not necessary to pre-train a Deep Neural Net-Hidden Markov Model (DNN-HMM acoustic model) and then preform sequence training; instead, the sequence training is combined into a training process of the Deep Neural Net-Hidden Markov Model (DNN-HMM acoustic model), which means that, only one training is required by the DNN-HMM-sequence training model, thus the required training time is reduced and recognition effect better than the DNN-HMM acoustic model is achieved.

Second Embodiment

Figure 2:
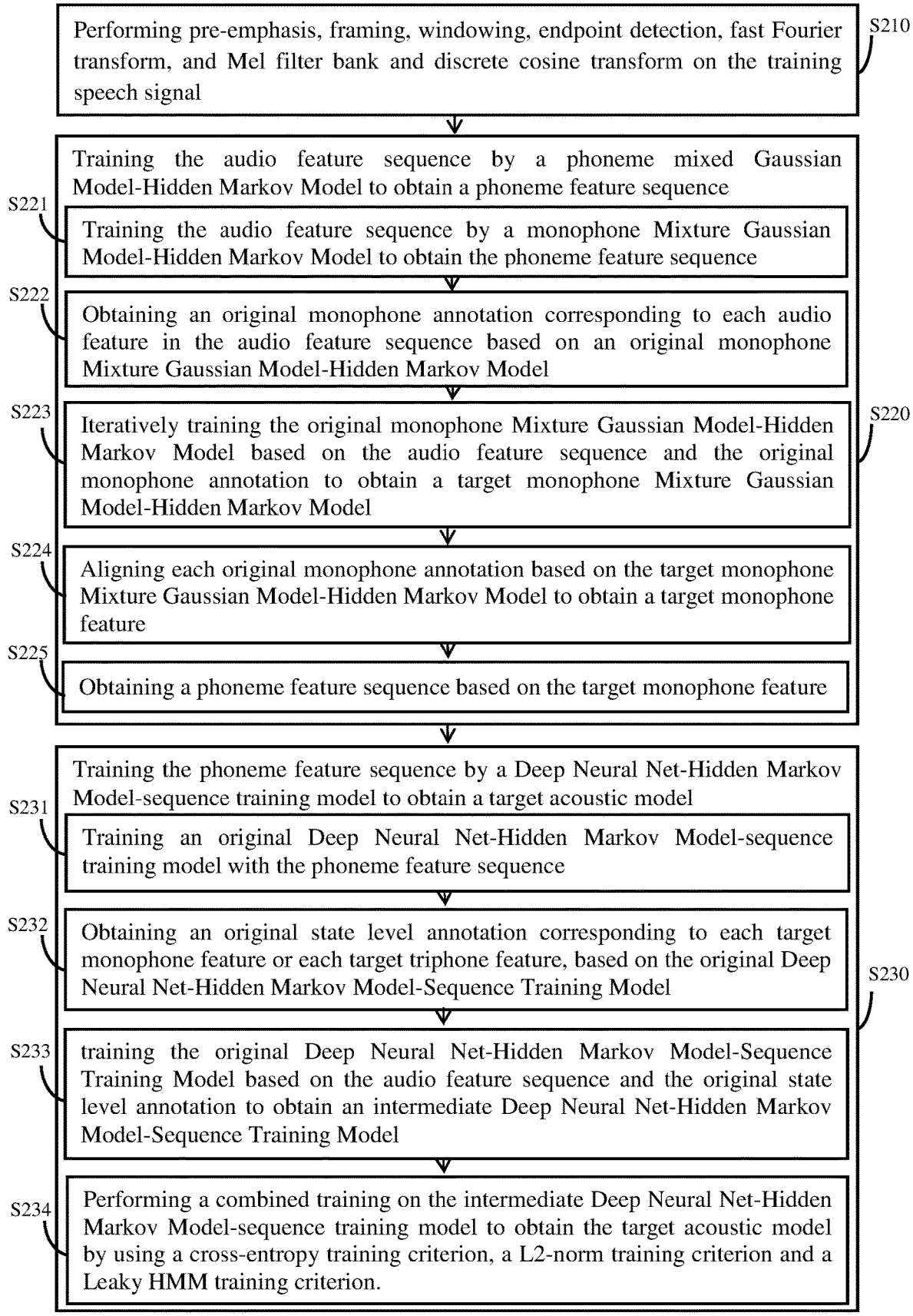
FIG. 2 is a flow chart of an acoustic model training method in a second embodiment of the present invention.

FIG. 2 shows a flow chart of the acoustic model training method in this embodiment. The acoustic model training method can be applied to financial institutions such as banks, securities, insurance, or other institutions that need to perform speech recognition, so as to utilize a trained target acoustic model for speech recognition to achieve artificial intelligence. As shown in FIG. 2, the acoustic model training method comprises the following steps:

S210: performing feature extraction on a training speech signal to obtain an audio feature sequence.

Therein the training speech signal is an original speech configured to perform acoustic model training, and the original speech may be a voice signal in way, mp3 or other format. Since the acoustic model training is based on feature sequences after feature extraction performed on the training speech signal, instead of directly training on the original speech signal, it is necessary to firstly extract a feature of the training speech signal and convert it into an audio feature sequence.

In this embodiment, in step S210, feature extraction is performed on the training speech signal to obtain an audio feature sequence, which specifically comprises: performing pre-emphasis, framing, windowing, endpoint detection, fast Fourier transform, and Mel filter bank and discrete cosine transform on the training speech signal to obtain the audio feature sequence.

The pre-emphasis is to pass the training speech signal through a high-pass filter $H(Z)=1-\mu z^{-1}$ with a value of $\mu$ is ranged between 0.9 and 1.0. A goal of pre-emphasis is to raise a high-frequency part, make a spectrum of a signal smooth, and a smooth spectrum can be kept in a whole frequency band from low frequency to high frequency, so that the same signal-to-noise ratio can be used to find the spectrum, highlighting the high frequency resonance peak.

Framing is to collect N sample points into one observation unit, which is named a frame. Normally, a value of N is 256 or 512, and time covered on the N sample points is about 20-30 ms. In order to avoid excessive changes in adjacent frames, an overlapping area is defined between two adjacent frames, the overlapping area contains M sampling points, and a value of M is normally about ½ or ⅓ of N. This process is named framing.

Windowing is to multiply each frame by Hamming window. Since a amplitude-frequency characteristic of Hamming window is large in side-lobe attenuation, a processing of windowing can increase continuity of a left end of a frame and a right end of a frame; Framing and windowing processes can convert a non-stationary speech signal into a short-term stationary signal. Define a signal after framing be $S(n)$, $n=0, 1 \ldots, N-1$, N is a size of a frame, the signal after framing is multiplied by a signal of Hamming window $S'(n)=S(n) \times W(n)$, therein a form of $W(n)$ is shown as following:

$$W(n, a) = (1-a) - a \times \cos\left[\frac{2\pi n}{N-1}\right], 0 \leq n \leq N-1,$$

different $\alpha$ values will produce different Hamming windows, in general, the value of $\alpha$ is 0.46.

Endpoint detection is mainly configured to distinguish speech and noise, and to extract valid speech parts. In an endpoint detection process, after framing and windowing, an energy value is calculated, a voice part and a noise part are distinguished according to the energy value, and an effective voice part is extracted therefrom.

Fast Fourier Transform is configured to convert a time domain signal into a frequency domain energy spectrum analysis. Since a characteristic of a signal is usually difficult to see when the signal is transformed in a time domain, the signal is usually converted into an energy distribution in a frequency domain to be observed, and different energy distributions represent characteristics of different speeches. Therefore, after being multiplied by the Hamming window, a signal of each frame needs to perform a fast Fourier transform to obtain an energy distribution in a spectrum. Fast Fourier transform is performed on signal of each frame after framing and windowing to obtain a spectrum of each frame (i.e., energy spectrum).

The Mel filter bank refers to passing the energy spectrum outputted by the fast Fourier transform through a set of Mel-scale triangular filter banks, defining a filter bank with M filters, and a filter used is a triangular filter, a center frequency is f(m), m=1, 2, . . . , M. M usually ranges from 22-26. The Mel filter bank is configured to smooth the spectrum and eliminate a filtering effect, so as to highlight characteristics of the resonant peak of a speech and reduce calculation. The logarithmic energy outputted by each triangular filter in the Mel filter bank is then calculated by following formula $s(m)=\ln(\Sigma_{k=0}^{N-1}|X_a(k)|^2 H_m(k))$, 0≤m≤M, where M is the number of triangular filters. The logarithmic energy is an acoustic feature of the Filter Bank and is commonly configured for DNN training.

Discrete cosine transform (DCT) is performed on the logarithmic energy outputted from the Mel filter bank to obtain Mel Frequency Cepstrum Coefficient (MFCC), which is commonly configured for GMM training. Specifically, the discrete cosine transform (DCT) is calculated as follows:

$$C(n) = \sum_{m=0}^{N-1} s(m)\cos\left(\frac{\pi n(m-0.5)}{M}\right), n = 1, 2, \ldots, L,$$

where M is the number of triangular filters, L is the order of the MFCC that usually ranges from 12-16, and the logarithmic energy is brought into the discrete cosine transform, then a Mel-scale Cepstrum parameter of the L-order can be obtained, and the phoneme feature sequence of the training speech signal is obtained based on the Mel Frequency Cepstrum Coefficient.

S220: Training the audio feature sequence by a monophone Mixture Gaussian Model-Hidden Markov Model to obtain the phoneme feature sequence.

A process that the monophone Mixture Gaussian Model-Hidden Markov Model (hereinafter referred to as a monophone GMM-HMM model) trains the audio feature sequence to obtain the phoneme feature sequence comprises an initial iteration and Multiple iterations.

In this embodiment, step S220 specifically comprises the following steps:

S221: Training an original monophone Mixture Gaussian Model-Hidden Markov Model with the audio feature sequence.

In the initial iteration of the monophone GMM-HMM model, a small number of audio feature sequences are roughly calculated to obtain the mean and variance, so as to obtain the original monophone Mixture Gaussian Model-Hidden Markov Model (i.e., the original monophone GMM-HMM model).

S222: Obtaining an original monophone annotation corresponding to each audio feature in the audio feature sequence based on the original monophone Mixture Gaussian Model-Hidden Markov Model.

In the initial iteration process of the monophone GMM-HMM model, based on the original monophone GMM-HMM model, the original monophone annotation corresponding to each audio feature in the audio feature sequence is obtained, which means that, a pronunciation word dictionary is used to replace a word corresponding to each audio feature in the audio feature sequence with a phoneme to obtain a corresponding original monophone annotation. Since it is pronounced only for each word, it is called a monophone (i.e., a monophone).

S223: Iteratively training the original monophone Mixture Gaussian Model-Hidden Markov Model based on the audio feature sequence and the original monophone annotation, so as to obtain a target monophone Mixture Gaussian Model-Hidden Markov Model.

After obtaining the original monophone GMM-HMM model after the initial iteration of the monophone GMM-HMM model, it needs to be iterated several times to obtain the target monophone Mixture Gaussian Model-Hidden Markov Model (i.e., the target monophone GMM-HMM Model), the purpose of multiple iterations is to improve accuracy of a phoneme feature extraction of an obtained target monophone GMM-HMM model. In following multiple iterations, each iteration needs to train the audio feature sequence extracted from the training speech signal and the original monophone annotation obtained in the previous iteration to obtain the target monophone GMM-HMM model.

S224: Aligning each original monophone annotation based on the target monophone Mixture Gaussian Model-Hidden Markov Model to obtain a target monophone feature.

In multiple iterations, each iteration needs to use the target monophone GMM-HMM model, and compare to the ground truth, so as to identify correct pronunciation of each word, and save it as a target monophone annotation corresponding to the next iteration. Alignment is performed according to starting time and ending time of a phoneme, aligned data is configured as text data of the acoustic model training, which is beneficial to guarantee accuracy of subsequent speech recognition. In this embodiment, multiple iterations generally need to perform 20-30 iterations, so that it can avoid too many iterations and lead to long training time; and also can avoid the number of iterations being too short, which affects accuracy of obtaining the phoneme feature sequence.

S225: Obtaining a phoneme feature sequence based on the target monophone feature.

Therein in steps S221-S224, the target monophone feature corresponding to each audio feature in the audio feature sequence is obtained, and then the phoneme feature sequence is formed based on all the target monophone features, so that the acoustic model training is directly performed based on the phoneme feature sequence, thereby improving accuracy of speech recognition based on an obtained target acoustic model.

S230: Training the phoneme feature sequence by the Deep Neural Net-Hidden Markov Model-sequence training Model to obtain the target acoustic model.

Therein the Deep Neural Net-Hidden Markov Model-sequence training model (hereinafter referred to as DNN-HMM-sequence training model) is a training model that combines DNN-HMM model training and sequence training. The phoneme feature sequence is a phoneme feature sequence obtained in step S220, and the phoneme feature sequence can be subjected to acoustic model training through the DNN-HMM-sequence training model to obtain the target acoustic model. Since the phoneme feature sequence obtained in the step S220 is a phone-level, in a training process based on the phoneme feature sequence, the obtained target acoustic model is based on a phone level, thus no phone-level conversion is required, which is beneficial to improve training efficiency. Moreover, the DNN-HMM-sequence training model combines sequence training into the DNN-HMM acoustic model, then one training through the DNN-HMM-sequence training model can replace two traditional training, thus required training time is greatly reduced and a better recognition effect than DNN-HMM acoustic model training is achieved. The Hidden Markov Model (HMM model) is a double stochastic process which is a display random function set and a hidden Markov chain with a certain state number, and is a training model based on a state level.

It can be understood that the phoneme feature sequence obtained by the monophone GMM-HMM model is a phone-level speech model, and only needs to train a candidate path of the sentence to be recognized, so that it is beneficial to improve training efficiency and save training time. The phone-level speech model is different from the traditional sequence training based on a word-level speech model for training, in the traditional sequence training, the phone-level conversion is required, and all possible candidate paths of the training speech signal are trained on a CPU, resulting in a slow training process of the acoustic model. In this embodiment, the audio feature sequence is trained into the phoneme feature sequence in advance by using the monophone GMM-HMM model, so that when the DNN-HMM-sequence training model performs a training, the training can directly be performed based on the phoneme feature sequence, without a requirement for the phone-level conversion, which is beneficial to improve training efficiency and save training time.

In this embodiment, in the acoustic model training method, a graph model for searching for possible candidate paths of all training data is also constructed. The graph model is similar to a pronunciation dictionary, a speech model (grammar rule) and a context relationship model which are used in a decoding step of the speech recognition method, and a decoding network constructed by the HMM, but does not need to use a pronunciation dictionary, and the HMM and the speech model used in a process of building the graph model are a single-state HMM and phone-level speech models constructed in the previous step. The construction process is completed by openfst open source tools.

In this embodiment, step S230 specifically comprises the following steps:

S231: Training an original Deep Neural Net-Hidden Markov Model-sequence training model with the phoneme feature sequence.

In an initial iteration of the original Deep Neural Net-Hidden Markov Model-sequence training Model, the original Deep Neural Net model (i.e., the original DNN-HMM-sequence training model) can be a long short-term memory recurrent neural net model (hereinafter referred to as a LSTM model), the LSTM model comprises a 5-layer LSTM layer, which means that, comprises one input layer, three hidden layers, and one output layer.

S232: Obtaining an original state level annotation corresponding to each target monophone feature, based on the original Deep Neural Net-Hidden Markov Model-Sequence Training Model.

Specifically, the original DNN-HMM-sequence training model is configured to compare correct pronunciation of each word in the ground truth and a temporal position of each state of each target monophone feature, and save it as the original state level annotation.

S233: Training the original Deep Neural Net-Hidden Markov Model-Sequence Training Model based on the audio feature sequence and the original state level annotation to obtain an intermediate Deep Neural Net-Hidden Markov Model-Sequence Training Model.

In multiple iterations of the original DNN-HMM-sequence training model, the original DNN-HMM sequence training model is trained based on the audio feature sequence obtained in step S210 and the original state level annotation acquired in step S233 to obtain the intermediate DNN-HMM sequence training model. Each iteration needs to train the audio feature sequence extracted from the training speech signal in step S210 and the original state level annotation obtained in the last time to obtain the intermediate DNN-HMM-sequence training model.

S234: Performing a combined training on the intermediate Deep Neural Net-Hidden Markov Model-sequence training model to obtain the target acoustic model by using a cross-entropy training criterion, a L2-norm training criterion and a Leaky HMM training criterion.

In a number of iterations, in order to incorporate word-level sequence training into phone-level DNN-HMM model, the cross-entropy training criterion, the L2-norm training criterion and the Leaky HMM training criterion and other constraints are configured to achieve a combination training of the two to obtain the target acoustic model.

The cross-entropy training criterion is a regular training criterion in the training of neural network models. The cross-entropy training criterion is shown as follows:

$$\text{Cost} = -\frac{1}{n}\sum_{x}[y \ln a + (1-y)\ln(1-a)],$$

where α is output of each neural network node, y is a labeled comparison sample, and x is input of each neural network node; Cost=0 when α=y.

The L2-norm training criterion is an additional constraint to combine the word-level sequence training into the phone-level DNN-HMM model to achieve a combination training of the two. The L2-norm training criterion is shown as follows:

$$\text{Cost} = \underset{cost}{\text{argmin}}\sum_{i} L(y, a) + \lambda\Omega(\text{cost}),$$

where L (•) refers to is a contrast deviation between output of the neural network node and the ground truth. The smaller the contrast deviation, the more the target acoustic model after training can be fitted to the training speech signal. Meanwhile, in order to prevent over-fitting phenomenon and to ensure that the target acoustic model obtained by training has a good expression effect on any testing data, a regular term λΩ(cos t) is required to be added. In the L2-norm training criterion, the regular term is shown as $\|\cos t\|_2 = \sqrt{\Sigma(\text{cost})^2}$.

The Leaky HMM training criterion are an additional constraint for combining the word-level sequence training into the phone-level DNN-HMM model. The Leaky HMM training criterion is a new neural network training criterion for matching a single-state HMM constructed in this embodiment to perform the DNN-HMM acoustic model of a traditional three-state HMM. The traditional three-state HMM has at least three transition probabilities, and the HMM configured in this embodiment is a single-state HMM. To achieve a transition of an a→b state, the transition probability is set as follows: P=leakyHMM coefficient×a transition probability of b state, where leakyHMM coefficient may be set to 0.1, An initial transition probability of b state is 0.5. During a target acoustic model training process, the transition probability of b state is continuously updated to combine the word-level sequence training into the phone-level DNN-HMM model.

In the acoustic model training method provided by this embodiment, the audio feature sequence obtained based on the training speech signal can be converted into the phoneme feature sequence by a phoneme GMM-HMM model training, thereby improving the efficiency of the acoustic model training and saving the training time. Using the Deep Neural Net-Hidden Markov Model-sequence training Model to train the phoneme feature sequence, only one training is required to realize effect of both Deep Neural Net-Hidden Markov Model Training and sequence training, so that the required training time is greatly reduced and a better recognition effect than a Deep Neural Net-Hidden Markov Model training is obtained. That is to say, in the acoustic model training method, it is not necessary to pre-train the Deep Neural Net-Hidden Markov Model (i.e., DNN-HMM acoustic model) and then perform the sequence training; instead, the sequence training is combined into the Deep Neural Net-Hidden Markov Model (i.e., DNN-HMM acoustic model), only one training is performed by the DNN-HMM-sequence training model, which can greatly reduce the required training time and achieve a better recognition effect than the DNN-HMM acoustic model training.

In the acoustic model training method provided in this embodiment, the DNN-HMM model training and the word-level sequence training are combined into one DNN-HMM-sequence training model without first training the DNN-HMM model followed by sequence training. At the same time, in the acoustic model training method, it is not necessary to generate possible candidate paths of all the training speech signals required in the word-level sequence training, so as to greatly reduce time required for a target acoustic model training and improve the accuracy of the speech recognition based on the target acoustic model. Since the DNN-HMM-sequence training model incorporates sequence training, it can make maximum use of the context relationship between words and words in the sentence, and then output more accurate recognition results. In the acoustic model training method, the word-level sequence training is combined into the phone-level DNN-HMM model by using the cross-entropy training criterion, the L2-norm training criterion, and the Leaky HMM training criterion, so as to achieve the combination training of the two to ensure a fitting effect.

Third Embodiment

Figure 3:
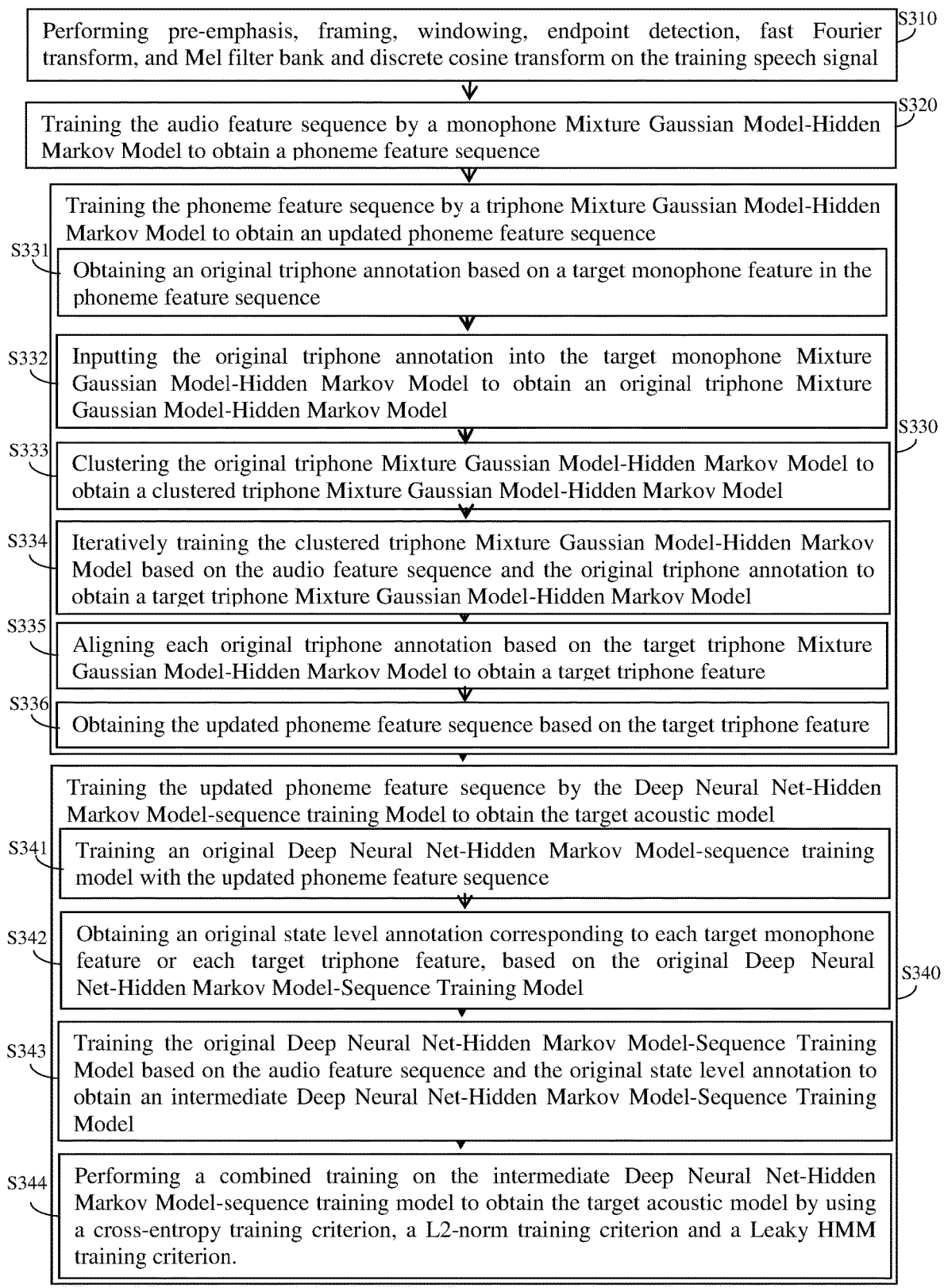
FIG. 3 is a flow chart of an acoustic model training method in a third embodiment of the present invention.

FIG. 3 shows an acoustic model training method in this embodiment. The acoustic model training method can be applied to financial institutions such as banks, securities, insurance or other institutions that need to perform speech recognition, so as to utilize a trained target acoustic model for speech recognition to achieve artificial intelligence. As shown in FIG. 3, the acoustic model training method comprises the following steps:

S310: performing feature extraction on a training speech signal to obtain an audio feature sequence.

Therein the training speech signal is an original speech configured to perform acoustic model training, and the original speech may be a voice signal in way, mp3 or other format. Since the acoustic model training is based on feature sequences after feature extraction performed on the training speech signal, instead of directly training on the original speech signal, it is necessary to firstly extract a feature of the training speech signal and convert it into an audio feature sequence.

In this embodiment, in step S310, feature extraction is performed on the training speech signal to obtain an audio feature sequence, which specifically comprises: Performing pre-emphasis, framing, windowing, endpoint detection, fast Fourier transform, and Mel filter bank and discrete cosine transform on the training speech signal to obtain the audio feature sequence. Step S310 is basically the same as an implementation process of step S210 in the second embodiment. To avoid repetition, details are not described herein.

S320: Training the audio feature sequence by a monophone Mixture Gaussian Model-Hidden Markov Model to obtain a phoneme feature sequence.

A process that the monophone Mixture Gaussian Model-Hidden Markov Model (hereinafter referred to as a monophone GMM-HMM model) trains the audio feature sequence to obtain the phoneme feature sequence comprises an initial iteration and Multiple iterations. Step S320 is basically the same as an implementation process of step S220 in the second embodiment. To avoid repetition, details are not described herein.

S330: Training the phoneme feature sequence by a triphone Mixture Gaussian Model-Hidden Markov Model to obtain an updated phoneme feature sequence.

It can be understood that, in the phoneme feature sequence obtained by training based on the monophone Mixture Gaussian Model-Hidden Markov Model, each target phoneme feature constituting the phoneme feature sequence does not fully consider its phoneme in related context. In this embodiment, the phoneme feature sequence outputted in step S320 is trained to obtain an update phoneme feature sequence by using a triphone Mixture Gaussian Model-Hidden Markov Model (hereinafter referred to as a triphone GMM-HMM model). The updated phoneme feature sequence fully considers its phoneme feature in related context, and further improves the accuracy of speech recognition based on the target acoustic model obtained by training the updated phoneme feature sequence. The training process of the phoneme feature sequence outputted in step S320 by using the triphone GMM-HMM model comprises a first iteration process and multiple iterations processes.

In this embodiment, step S330 specifically comprises the following steps:

S331: Obtaining an original triphone annotation based on a target monophone feature in the phoneme feature sequence.

In the initial iterative process of the triphone GMM-HMM model, the original triphone annotation is obtained by adding its related context to each of phonemes of a small number of the target phoneme feature of the phoneme feature sequence.

S332: Inputting the original triphone annotation into the target monophone Mixture Gaussian Model-Hidden Markov Model to obtain an original triphone Mixture Gaussian Model-Hidden Markov Model.

In the initial iterative process of the triphone GMM-HMM model, the original triphone annotation obtained in step S331 is inputted into the target monophone GMM-HMM model acquired in step S323 to obtain the original triphone Mixture Gaussian Model-Hidden Markov Model (i.e., the original triphone GMM-HMM model), so that the original triphone GMM-HMM model can be trained based on triphones to improve training accuracy.

S333: Clustering the original triphone Mixture Gaussian Model-Hidden Markov Model to obtain a clustered triphone Mixture Gaussian Model-Hidden Markov Model.

In the initial iteration process of the triphone GMM-HMM model, a decision tree algorithm is configured to cluster the original triphone annotation with similar pronunciations in the original triphone GMM-HMM model acquired in step S332 to obtain the clustered triphone Mixture Gaussian Model-Hidden Markov Model (hereinafter referred to as the clustered triphone GMM-HMM model), which is configured to improve efficiency and accuracy of speech recognition performed by a trained acoustic model.

S334: Iteratively training the clustered triphone Mixture Gaussian Model-Hidden Markov Model based on the audio feature sequence and the original triphone annotation to obtain a target triphone Mixture Gaussian Model-Hidden Markov Model.

After obtaining the clustered triphone GMM-HMM model in the initial iteration of the triphone GMM-HMM model, it is necessary to iterate several times to obtain the target triphone Mixture Gaussian Model-Hidden Markov Model (hereinafter referred to as the target triphone GMM-HMM model). In the following multiple iterations, each iteration needs to train the audio feature sequence extracted from the training speech signal and the original triphone annotation obtained in the previous iteration to obtain the target triphone GMM-HMM model.

S335: Aligning each original triphone annotation based on the target triphone Mixture Gaussian Model-Hidden Markov Model to obtain a target triphone feature.

In the multiple iterative processes, the target triphone GMM-HMM model is used in each iteration, and the original triphone annotation generated by the initial iteration are compared with ground truth to identify correct pronunciation of each word, and then it is saved as the target triphone annotation for the next iteration, and align it according to starting time and ending time of the phoneme. In this embodiment, multiple iterations generally need to perform 20-30 iterations, so that it can avoid excessive number of iterations, leading to long training time; and also avoid the number of iterations being too short, which affects efficiency of training to obtain the updated phoneme feature sequences for feature recognition.

S336: Obtaining the updated phoneme feature sequence based on the target triphone feature.

Therein in steps S331-S336, the target triphone feature corresponding to each audio feature in the audio feature sequence is obtained, and then the updated phoneme feature sequence is formed based on all the target triphone features, so that the acoustic model training is directly performed based on the updated phoneme feature sequence, thereby improving accuracy of speech recognition based on an obtained target acoustic model.

S340: Training the updated phoneme feature sequence by the Deep Neural Net-Hidden Markov Model-sequence training Model to obtain the target acoustic model.

The phoneme feature sequence is the updated phoneme feature sequence obtained in step S330, and is more advantageous for improving recognition efficiency and accuracy of the obtained target acoustic model than the phoneme feature sequence acquired in step S220. In a training process of the phoneme feature sequence based on the Deep Neural Net-Hidden Markov Model-sequence training (hereinafter referred to as DNN-HMM-sequence training model), the obtained target acoustic model is based on phone-level training, thus no phone-level conversion is required, which is beneficial to improve training efficiency. Moreover, the DNN-HMM-sequence training model combines sequence training into the DNN-HMM acoustic model, then one training through the DNN-HMM-sequence training model can replace two traditional training, thus required training time is greatly reduced and a better recognition effect than DNN-HMM acoustic model training is achieved. The Hidden Markov Model (HMM model) is a double stochastic process which is a display random function set and a hidden Markov chain with a certain state number, and is a training model based on a state level.

Specifically, step S330 constructs a new decision tree expression, and a triphone GMM-HMM model is applied to cluster triphones with similar pronunciations, and each cluster result is called a Senone. In this embodiment, Senone is a three-state HMM, and each Senone can be expressed by a minimum of three frames. Each HMM can be expressed in one frame, considering only the first frame of each phoneme (i.e., the first state), and setting the rest of the state to null, then one HMM represents a or ab or abb. Acoustic model training is performed by using the updated phoneme feature sequence obtained by the triphone GMM-HMM model, so that recognition accuracy is higher when the speech recognition is performed by the obtained target acoustic model.

It can be understood that the phoneme Mixture Gaussian Model-Hidden Markov Model (comprising the monophone GMM-HMM model and the triphone GMM-HMM model) is a phone-level speech model, and only needs to train a candidate path of the sentence to be recognized, so that it is beneficial to improve training efficiency and save training time. The phone-level speech model is different from the traditional sequence training based on a word-level speech model for training, in the traditional sequence training, the phone-level conversion is required, and all possible candidate paths of the training speech signal are trained on a CPU, resulting in a slow training process of the acoustic model. In this embodiment, the audio feature sequence is trained into the phoneme feature sequence in advance by using the monophone GMM-HMM model and the triphone GMM-HMM model, so that when the DNN-HMM-sequence training model performs a training, the training can directly be performed based on the phoneme feature sequence, without a requirement for the phone-level conversion, which is beneficial to improve training efficiency and save training time.

In this embodiment, in the acoustic model training method, a graph model for searching for possible candidate paths of all training data is also constructed. The graph model is similar to a pronunciation dictionary, a speech model (grammar rule) and a context relationship model which are used in a decoding step of the speech recognition method, and a decoding network constructed by the HMM, but does not need to use a pronunciation dictionary, and the HMM and the speech model used in a process of building the graph model are a single-state HMM and the phone-level speech model constructed in the previous step. The construction process is completed by openfst open source tools.

In this embodiment, step S340 specifically comprises the following steps:

S341: Training an original Deep Neural Net-Hidden Markov Model-sequence training model with the updated phoneme feature sequence.

In an initial iteration of the original Deep Neural Net-Hidden Markov Model-sequence training Model, the original Deep Neural Net model (i.e., the original DNN-HMM-sequence training model) can be a long short-term memory recurrent neural net model (hereinafter referred to as a LSTM model), the LSTM model comprises a 5-layer LSTM layer, which means that, comprises one input layer, three hidden layers, and one output layer.

S342: Obtaining an original state level annotation corresponding to each target triphone feature, based on the original Deep Neural Net-Hidden Markov Model-Sequence Training Model.

In this embodiment, the original DNN-HMM-sequence training model is configured to compare correct pronunciation of each word in the ground truth and a temporal position of each state of each target triphone feature, and save it as the original state level annotation.

S343: Training the original Deep Neural Net-Hidden Markov Model-Sequence Training Model based on the audio feature sequence and the original state level annotation to obtain an intermediate Deep Neural Net-Hidden Markov Model-Sequence Training Model.

In multiple iterations of the original DNN-HMM-sequence training model, the original DNN-HMM sequence training model is trained based on the audio feature sequence obtained in step S210 and the original state level annotation acquired in step S233 to obtain the intermediate DNN-HMM sequence training model. Each iteration needs to train the audio feature sequence extracted from the training speech signal in step S210 and the original state level annotation obtained in the last time to obtain the intermediate DNN-HMM-sequence training model.

S344: performing a combined training on the intermediate Deep Neural Net-Hidden Markov Model-sequence training model to obtain the target acoustic model by using a cross-entropy training criterion, a L2-norm training criterion and a Leaky HMM training criterion.

In a number of iterations, in order to incorporate word-level sequence training into phone-level DNN-HMM model, the cross-entropy training criterion, the L2-norm training criterion and the Leaky HMM training criterion and other constraints are configured to achieve a combination training of the two to obtain the target acoustic model. Since the cross-entropy training criterion, the L2-norm training criterion, and the Leaky HMM training criterion have been described in detail in the second embodiment 2, in order to avoid repetition, details are not described herein.

In the acoustic model training method provided by this embodiment, the audio feature sequence obtained based on the training speech signal can be converted into the phoneme feature sequence by a phoneme GMM-HMM model training, thereby improving the efficiency of the acoustic model training and saving the training time. Using the Deep Neural Net-Hidden Markov Model-sequence training Model to train the phoneme feature sequence, only one training is required to realize effect of both Deep Neural Net-Hidden Markov Model Training and sequence training, so that the required training time is greatly reduced and a better recognition effect than a Deep Neural Net-Hidden Markov Model training is obtained. That is to say, in the acoustic model training method, it is not necessary to pre-train the Deep Neural Net-Hidden Markov Model (i.e., DNN-HMM acoustic model) and then perform the sequence training; instead, the sequence training is combined into the Deep Neural Net-Hidden Markov Model (i.e., DNN-HMM acoustic model), only one training is performed by the DNN-HMM-sequence training model, which can greatly reduce the required training time and achieve a better recognition effect than the DNN-HMM acoustic model training.

In this embodiment, in the acoustic model training method, the DNN-HMM model training and the word-level sequence training are combined into one DNN-HMM-sequence training model without first training the DNN-HMM model followed by sequence training. At the same time, in the acoustic model training method, it is not necessary to generate possible candidate paths of all the training speech signals required in the word-level sequence training, so as to greatly reduce time required for a target acoustic model training and improve the accuracy of the speech recognition based on the target acoustic model. Since the DNN-HMM-sequence training model incorporates sequence training, it can make maximum use of the context relationship between words and words in the sentence, and then output more accurate recognition results. In the acoustic model training method, the word-level sequence training is combined into the phone-level DNN-HMM model by using the cross-entropy training criterion, the L2-norm training criterion, and the Leaky HMM training criterion, so as to achieve the combination training of the two to ensure a fitting effect.

Fourth Embodiment

Figure 4:
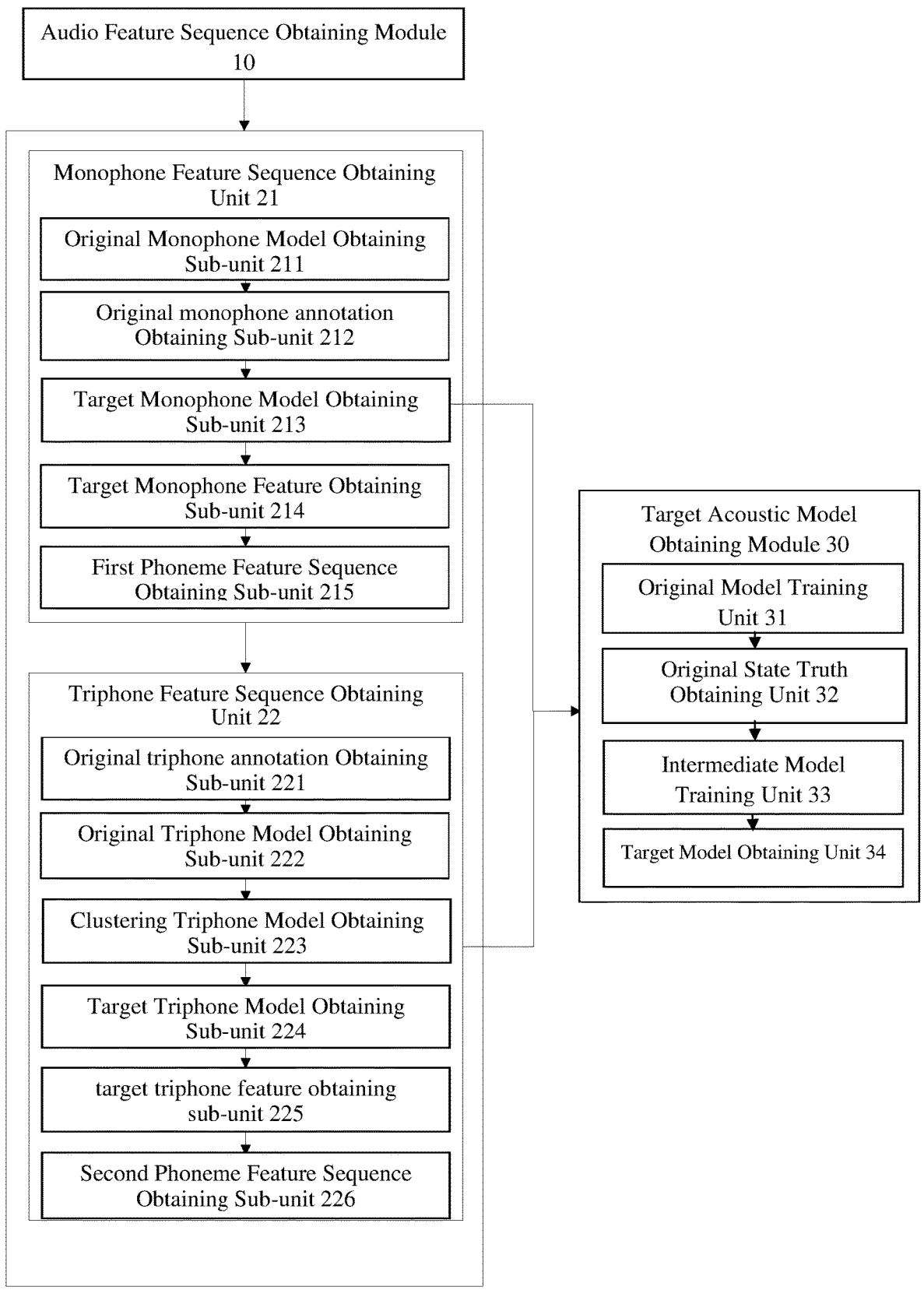
FIG. 4 is a schematic diagram of an acoustic model training apparatus in a fourth embodiment of the present invention.

Corresponding to the acoustic model training methods in the first embodiment, the second embodiment and the third embodiment, FIG. 4 shows an acoustic model training apparatus corresponding to the acoustic model training methods shown in the first embodiment, the second embodiment and the third embodiment. As shown in FIG. 4, the acoustic model training apparatus comprises an audio feature sequence obtaining module 10, a phoneme feature sequence obtaining module 20, and a target acoustic model obtaining module 30. Implementation functions of the audio feature sequence obtaining module 10, the phoneme feature sequence obtaining module 20, and the target acoustic model obtaining module 30 are in correspondence with corresponding steps in the first embodiment and the second embodiment. To avoid repeating, details are not described herein.

The audio feature sequence obtaining module 10 is configured to perform feature extraction from a training speech signal to obtain an audio feature sequence.

The phoneme feature sequence obtaining module 20 is configured to train the audio feature sequence by a phoneme mixed Gaussian Model-Hidden Markov Model to obtain a phoneme feature sequence.

The target acoustic model obtaining module 30 is configured to train the phoneme feature sequence by a Deep Neural Net-Hidden Markov Model-sequence training model to obtain a target acoustic model.

Advantageously, the audio feature sequence obtaining module 10 is configured to perform pre-emphasis, framing, windowing, endpoint detection, fast Fourier transform, and Mel filter bank and discrete cosine transform on the training speech signal.

Advantageously, the phoneme feature sequence obtaining module 20 comprises a monophone feature sequence obtaining unit 21 for training the audio feature sequence by a monophone Mixture Gaussian Model-Hidden Markov Model to obtain a phoneme feature sequence.

Specifically, the monophone feature sequence obtaining unit 21 comprises an original monophone model obtaining sub-unit 211, an original monophone annotation obtaining sub-unit 212, a target monophone model obtaining sub-unit 213, a target monophone feature obtaining sub-unit 214, and a first phoneme feature sequence obtaining sub-unit 215 is obtained.

The original monophone model obtaining sub-unit 211 is configured to train an original monophone Mixture Gaussian Model-Hidden Markov Model with the audio feature sequence.

The original monophone annotation obtaining sub-unit 212 is configured to an original monophone annotation corresponding to each audio feature in the audio feature sequence based on the original monophone Mixture Gaussian Model-Hidden Markov Model.

The target monophone model obtaining sub-unit 213 is configured to iteratively train the original monophone Mixture Gaussian Model-Hidden Markov Model based on the audio feature sequence and the original monophone annotation, so as to obtain a target monophone Mixture Gaussian Model-Hidden Markov Model.

The target monophone feature obtaining sub-unit 214 is configured to perform alignment processing on each original monophone annotation based on the target monophone Mixture Gaussian Model-Hidden Markov Model to obtain a target monophone feature.

The first phoneme feature sequence obtaining sub-unit 215 is configured to obtain a phoneme feature sequence based on the target monophone feature.

Advantageously, the phoneme feature sequence obtaining module 20 further comprises a triphone feature sequence obtaining unit 22 for training the phoneme feature sequence by a triphone Mixture Gaussian Model-Hidden Markov Model to obtain an updated phoneme feature sequence.

Specifically, the triphone feature sequence obtaining unit 22 comprises an original triphone annotation obtaining sub-unit 221, an original triphone model obtaining sub-unit 222, a clustering triphone model obtaining sub-unit 223, a target triphone model obtaining sub-unit 224, a target triphone feature obtaining sub-unit 225 and a second phoneme feature sequence obtaining sub-unit 226.

The original triphone annotation obtaining sub-unit 221 is configured to obtain an original triphone annotation based on the target monophone feature in the phoneme feature sequence.

The original triphone model obtaining sub-unit 222 is configured to input the original triphone annotation into the target monophone Mixture Gaussian Model-Hidden Markov Model to obtain an original triphone Mixture Gaussian Model-Hidden Markov Model.

The clustering triphone model obtaining sub-unit 223 is configured for clustering the original triphone Mixture Gaussian Model-Hidden Markov Model to obtain a clustered triphone Mixture Gaussian Model-Hidden Markov Model.

The target triphone model obtaining sub-unit 224 is configured for iteratively training the clustered triphone Mixture Gaussian Model-Hidden Markov Model based on the audio feature sequence and the original triphone annotation to obtain a target triphone Mixture Gaussian Model-Hidden Markov Model.

The target triphone feature obtaining sub-unit 225 is configured to perform alignment processing on each original triphone annotation based on the target triphone Mixture Gaussian Model-Hidden Markov Model to obtain a target triphone feature.

The second phoneme feature sequence obtaining sub-unit 226 is configured to obtain the updated phoneme feature sequence based on the target triphone feature.

Specifically, the target acoustic model obtaining module 30 comprises an original model training unit 31, an original state truth obtaining unit 32, an intermediate model training unit 33, and a target model obtaining unit 34.

The original model training unit 31 is configured to train an original Deep Neural Net-Hidden Markov Model-sequence training model with the phoneme feature sequence.

The original state truth obtaining unit 32 is configured to obtain an original state level annotation corresponding to each target monophone feature or each target triphone feature, based on the original Deep Neural Net-Hidden Markov Model-Sequence Training Model.

The intermediate model training unit 33 is configured to train the original Deep Neural Net-Hidden Markov Model-Sequence Training Model based on the audio feature sequence and the original state level annotation to obtain an intermediate Deep Neural Net-Hidden Markov Model-Sequence Training Model.

The target model obtaining unit 34 is configured to performing a combined training on the intermediate Deep Neural Net-Hidden Markov Model-sequence training model to obtain the target acoustic model by using a cross-entropy training criterion, a L2-norm training criterion and a Leaky HMM training criterion.

Fifth Embodiment

Figure 5:
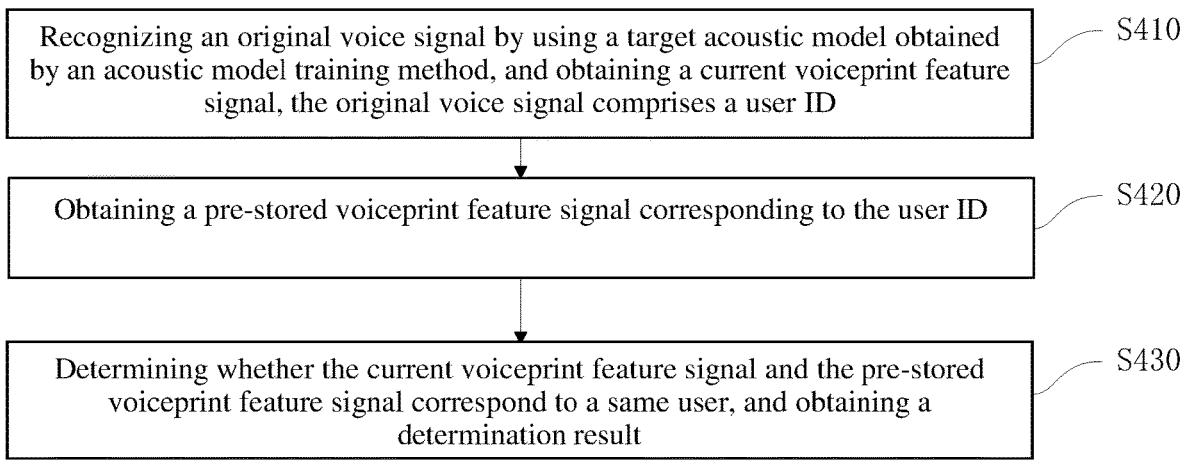
FIG. 5 is a flow chart of a speech recognition method in a fifth embodiment of the present invention.

FIG. 5 shows a speech recognition method in this embodiment. The speech recognition method can be applied to financial institutions such as banks, securities, insurance or other institutions that need to perform speech recognition, so as to utilize a trained target acoustic model for speech recognition to achieve artificial intelligence. As shown in FIG. 5, the speech recognition method comprises the following steps:

S410: Recognizing an original voice signal by using a target acoustic model obtained by an acoustic model training method, and obtaining a current voiceprint feature signal, the original voice signal comprises a user ID.

Therein the target acoustic model is obtained by using the acoustic model training method in the first embodiment, the second embodiment and the third embodiment, and has characteristics of fast recognition efficiency and high accuracy. The original voice signal is a user voice signal collected in real time. The user ID is configured to uniquely recognize identity of the user, and may be a user account, an ID number, or the like. After the original speech signal is recognized by using the target acoustic model, an obtained current voiceprint feature signal is associated with the user ID.

S420: Obtaining a pre-stored voiceprint feature signal corresponding to the user ID.

Therein the pre-stored voiceprint feature signal is pre-stored in a database of a financial institution such as a bank, a securities company, an insurance company, or another institution that needs to perform speech recognition. In a process of the speech recognition, a corresponding pre-stored voiceprint feature signal can be obtained by a search based on the user ID.

S430: Determining whether the current voiceprint feature signal and the pre-stored voiceprint feature signal correspond to a same user, and obtaining a determination result.

Since the current voiceprint feature signal and the pre-stored voiceprint feature signal are all associated with the user ID, the difference between the two is compared by using a voiceprint feature comparison algorithm to determine whether they belong to the same user, and the determination result is fed back to the bank, the securities company, the insurance company, or another institution that needs to perform the speech recognition.

In a specific embodiment, the step S43 may specifically comprise the following steps: firstly, a PLDA algorithm is configured to reduce dimensions of a target voiceprint feature and a test voiceprint feature, respectively, and obtain a target dimension reduction value and a test dimension reduction value. Then the cosine integral function is configured to cosine the target dimension reduction value and the test dimension reduction value to obtain a cosine integral value. Finally, it is determined whether the cosine integral value is greater than a similar threshold; if the cosine integral value is greater than the similar threshold, the current voiceprint feature signal and the pre-stored voiceprint feature signal correspond to the same user; if the cosine integral value is not greater than the similar threshold, the current voiceprint feature signal and the pre-stored voiceprint feature signal do not correspond to the same user.

In the speech recognition method provided in this embodiment, the current voiceprint feature signal corresponding to the user ID is obtained by using the target acoustic model, which has the advantages of fast recognition efficiency and high accuracy. Then, by comparing the current voiceprint feature signal with the corresponding pre-stored voiceprint feature signal to determine whether the current voiceprint feature signal and the pre-stored voiceprint feature signal correspond to the same user, the purpose of quickly identifying a user identity can be achieved.

Sixth Embodiment

Figure 6:
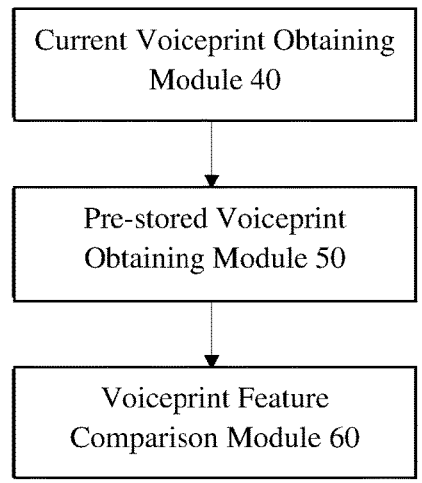
FIG. 6 is a schematic diagram of a speech recognition apparatus in a sixth embodiment of the present invention.

Corresponding to the speech recognition method in the fifth embodiment, FIG. 6 shows a speech recognition apparatus corresponding to the speech recognition method shown in the fifth embodiment. As shown in FIG. 6, the speech recognition apparatus comprises a current voiceprint obtaining module 40, a pre-stored voiceprint obtaining module 50, and a voiceprint feature comparison module 60. The implementation functions of the current voiceprint obtaining module 40, the pre-stored voiceprint obtaining module 50, and the voiceprint feature comparison module 60 are in correspondence with corresponding steps in the fifth embodiment. To avoid repeating, the present embodiment does not describe the details.

The current voiceprint obtaining module 40 is configured to recognize an original voice signal by using a target acoustic model obtained by an acoustic model training method, and obtaining a current voiceprint feature signal, the original voice signal comprises a user ID.

The pre-stored voiceprint obtaining module 50 is configured to obtain a pre-stored voiceprint feature signal corresponding to the user ID.

The voiceprint feature comparison module 60 is configured to determine whether the current voiceprint feature signal and the pre-stored voiceprint feature signal correspond to a same user, and obtaining a determination result.

Seventh Embodiment

The embodiment provides a computer readable storage medium in which a computer program is stored, and when the computer program is executed by a processor, the acoustic model training method in the first embodiment, the second embodiment or the third embodiment is achieved. To avoid repeating, the present embodiment does not describe the details. Alternatively, when the computer program is executed by the processor, functions of the models/units in the acoustic model training apparatus in the fourth embodiment are realized. To avoid repetition, details are not described herein. Alternatively, a function of each step in the speech recognition method in the fifth embodiment is realized when the computer program is executed by the processor. To avoid repetition, details are not described herein. Alternatively, when the computer program is executed by the processor, functions of the modules/units in the speech recognition apparatus in the sixth embodiment are achieved. To avoid repetition, details are not described herein.

Eighth Embodiment

Figure 7:
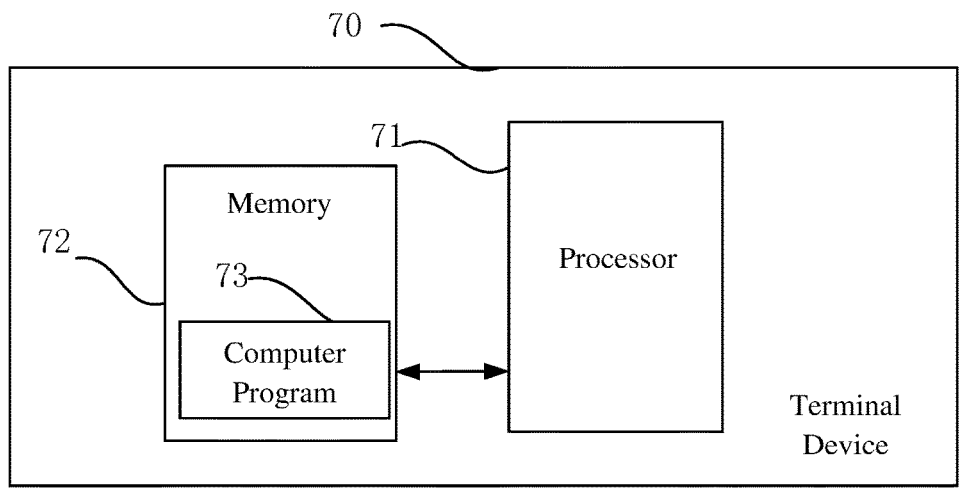
FIG. 7 is a schematic diagram of a terminal device in an eight embodiment of the present invention.

FIG. 7 is a schematic diagram of a terminal device according to an embodiment of the present invention. As shown in FIG. 7, the terminal device 70 of this embodiment comprises a processor 71, a memory 72, and a computer program 73 which is stored in the memory 72 and is operable on the processor 71, when the computer program 73 is executed by a processor 71, the acoustic model training method in the first embodiment, the second embodiment or the third embodiment is achieved. To avoid repeating, the present embodiment does not describe the details. Alternatively, when the computer program 73 is executed by the processor 71, functions of the models/units in the acoustic model training apparatus in the fourth embodiment are realized. To avoid repetition, details are not described herein. Alternatively, a function of each step in the speech recognition method in the fifth embodiment is realized when the computer program 73 is executed by the processor 71. To avoid repetition, details are not described herein. Alternatively, when the computer program 73 is executed by the processor 71, functions of the modules/units in the speech recognition apparatus in the sixth embodiment are achieved. To avoid repetition, details are not described herein.

Illustratively, the computer program 73 can be partitioned into one or more modules/units, one or more modules/units being stored in memory 72 and executed by processor 71 to complete the present invention. The one or more modules/units may be a series of computer program instructions that are capable of performing a particular function, the instructions are configured to describe an execution process of computer program 73 in terminal device 70. For example, the computer program 73 can be divided into the audio feature sequence obtaining module 10, the phoneme feature sequence obtaining module 20, and the target acoustic model obtaining module 30 in the fourth embodiment. Alternatively, the computer program 73 may be divided into the current voiceprint obtaining module 40, the pre-stored voiceprint obtaining module 50, and the voiceprint feature comparison module 60 in the sixth embodiment, and specific functions of each module are as described in the fourth embodiment or the sixth embodiment, and will not be repeated here.

The terminal device 70 can be a computing device such as a desktop computer, a notebook, a palmtop computer, and a cloud server. The terminal device may comprise, but is not limited to, a processor 71, a memory 72. It will be understood by those skilled in the prior art that FIG. 7 is merely an example of the terminal device 70 and does not constitute a limitation of the terminal device 70, and the terminal device 70 may comprise more or less components than those illustrated in FIG. 7, or may combine certain components or different components, for instance, the terminal device 70 may further comprise an input/output device, a network access device, a bus, and the like.

The processor 71 may be a central processing unit (CPU), or may be other general purpose processors, a digital signal processor (DSP), an application specific Integrated circuit (ASIC), Field-Programmable Gate Array (FPGA) or other programmable logic devices, discrete gates or transistor logic devices, discrete hardware components, and the like. A general purpose processor may be a microprocessor or the processor 71 may be any conventional processor or the like.

The memory 72 may be an internal storage unit of the terminal device 70, such as a hard disk or a memory of the terminal device 70. The memory 72 may also be an external storage device of the terminal device 70, such as a plug-in hard disk equipped with the terminal device 70, a smart media card (SMC), a secure digital (SD) card, and a flash card and so on. Further, the memory 72 may also comprise both an internal storage unit of the terminal device 70 and an external storage device. The memory 72 is configured to store computer programs as well as other programs and data required by the terminal device 70. The memory 72 can also be configured to temporarily store data that has been outputted or will be outputted.

It will be apparent to those skilled in the prior art that, for convenience and brevity of description, only a division of each functional unit and module described above is exemplified. In practical applications, the above functions may be assigned to different functional units according to requirements, which means that, dividing an internal structure of the device into different functional units or modules to perform all or part of the functions described above. Each functional unit and module in the embodiment may be combined into one processing unit, or each unit may exist physically and separately, or two or more units may be integrated into one unit, and the integrated unit may be realized in the form of hardware or in the form of a software functional unit. In addition, specific names of functional units and modules are only for a purpose of facilitating mutual differentiation, and are not intended to limit a scope of protection of the present application. For a specific working process of the unit and the module in the foregoing system, reference may be made to the corresponding process in the foregoing method embodiments, and details are not described herein again.

In the above embodiments, descriptions of the embodiments have different important parts, and parts that are not detailed or described in a certain embodiment can be referred to related descriptions of other embodiments.

One skilled in the prior art will appreciate that the units in each embodiment and algorithm steps in the above embodiments disclosed above can be achieved by electronic hardware or a combination of computer software and electronic hardware. Whether these functions are performed in hardware or software depends on a specific application and design constraints of a technical solution. A person skilled in the prior art can use different methods for implementing the described functions for each particular application, but such implementation should not be considered to be beyond the scope of the present invention.

In the embodiments provided by the present invention, it should be understood that the disclosed apparatus/terminal device and method may be realized in other manners. For instance, the apparatus/terminal device embodiment described above is merely illustrative. For example, a division of the module or unit is only a logical function division. In an actual application, there may be another division manners, for example, multiple units or components may be combined or integrated into another system, or some features may be ignored or not implemented. In addition, a mutual coupling or direct coupling or communication connection shown or discussed may be an indirect coupling or communication connection through some interfaces, devices or units, and may be electrical, mechanical or others.

The units described as separate components may or may not be physically separated, and the components displayed as units may or may not be physical units, which means that, may be located in one place, or may be distributed to multiple network units. Some or all of the units may be selected according to actual requirements to achieve the purpose of the technical solution of the embodiment.

In addition, each functional unit in each embodiment of the present invention may be integrated into one processing unit, or each unit may exist physically and separately, or two or more units may be integrated into one unit. The above integrated unit can be realized in the form of hardware or in the form of a software functional unit.

The integrated module/unit may be stored in a computer readable storage medium if it is realized in the form of the software functional unit and sold or used as a separate product. Based on this understanding, all or part of processes realized in the above embodiments of the present invention may also be completed by a computer program to instruct related hardware. The computer program may be stored in a computer readable storage medium, the steps of each embodiment of the method described above may be realized when the computer program is executed by the processor. Therein the computer program comprises computer program codes, which may be in the form of source codes, object codes, executable files or in some intermediate forms. A computer readable medium may comprise an entity or a device capable of carrying the computer program codes, a recording medium, a USB flash drive, a removable hard disk, a magnetic disk, an optical disk, a computer memory, a read-only memory (ROM), random access memory (RAM), an electrical carrier signal, a telecommunication signal, a software distribution media, and so on. It should be noted that content contained in the computer readable medium may be appropriately increased or decreased according to requirements of legislation and patent practice in a jurisdiction, for example, in some jurisdictions, according to legislation and patent practice, the computer readable medium does not comprise an electrical carrier signal and a telecommunication signal.

The above embodiments are only configured to illustrate technical solutions of the present invention, and are not intended to limit the technical solutions of the present invention; although the present invention has been described in detail with reference to the foregoing embodiments, it will be understood by one skilled in the prior art that the technical solutions may be modified, or some technical features may be replaced by equivalents; and modifications or replacements that do not deviate from spirit and scope of the technical solutions of the embodiments of the present invention should be comprised within the scope of protection of present invention.

The invention claimed is:

1. An acoustic model training method, comprising:
performing feature extraction on a training speech signal to obtain an audio feature sequence;
training the audio feature sequence by a phoneme mixed Gaussian Model-Hidden Markov Model to obtain phoneme feature sequence; and
training the phoneme feature sequence by a Deep Neural Net-Hidden Markov Model-sequence training model to obtain a target acoustic model;
wherein training the audio feature sequence by a phoneme mixed Gaussian Model-Hidden Markov Model to obtain a phoneme feature sequence comprises:
training the audio feature sequence by a monophone Mixture Gaussian Model-Hidden Markov Model to obtain the phoneme feature sequence;

training the original monophone mixed Gaussian Model-Hidden Markov Model by the audio feature sequence;

obtaining an original monophone annotation corresponding to each audio feature in the audio feature sequence based on the original monophone Mixture Gaussian Model-Hidden Markov Model;

iteratively training the original monophone Mixture Gaussian Model-Hidden Markov Model based on the audio feature sequence and the original monophone annotation to obtain a target monophone Mixture Gaussian Model-Hidden Markov Model;

aligning each original monophone annotation based on the target monophone Mixture Gaussian Model-Hidden Markov Model to obtain a target monophone feature; and obtaining a phoneme feature sequence based on the target monophone feature.

2. The acoustic model training method according to claim 1, wherein performing feature extraction on a training speech signal comprises:

performing pre-emphasis, framing, windowing, endpoint detection, fast Fourier transform, and Mel filter bank and discrete cosine transform on the training speech signal.

3. The acoustic model training method according to claim 1, wherein training the audio feature sequence by a phoneme mixed Gaussian Model-Hidden Markov Model to obtain a phoneme feature sequence comprises:

training the phoneme feature sequence by a triphone Mixture Gaussian Model-Hidden Markov Model to obtain an updated phoneme feature sequence;

wherein training the phoneme feature sequence by a triphone Mixture Gaussian Model-Hidden Markov Model to obtain an updated phoneme feature sequence comprises:

obtaining an original triphone annotation based on the target monophone feature in the phoneme feature sequence;

inputting the original triphone annotation into the target monophone Mixture Gaussian Model-Hidden Markov Model to obtain an original triphone Mixture Gaussian Model-Hidden Markov Model;

clustering the original triphone Mixture Gaussian Model-Hidden Markov Model to obtain a clustered triphone Mixture Gaussian Model-Hidden Markov Model;

iteratively training the clustered triphone Mixture Gaussian Model-Hidden Markov Model based on the audio feature sequence and the original triphone annotation to obtain a target triphone Mixture Gaussian Model-Hidden Markov Model;

aligning each original triphone annotation based on the target triphone Mixture Gaussian Model-Hidden Markov Model to obtain a target triphone feature; and obtaining the updated phoneme feature sequence based on the target triphone feature.

4. The acoustic model training method according to claim 3, wherein training the phoneme feature sequence by a Deep Neural Net-Hidden Markov Model-sequence training model to obtain a target acoustic model comprises:

training an original Deep Neural Net-Hidden Markov Model-sequence training model with the phoneme feature sequence;

obtaining an original state level annotation corresponding to each target monophone feature or each target triphone feature, based on the original Deep Neural Net-Hidden Markov Model-Sequence Training Model;

training the original Deep Neural Net-Hidden Markov Model-Sequence Training Model based on the audio feature sequence and the original state level annotation to obtain an intermediate Deep Neural Net-Hidden Markov Model-Sequence Training Model; and performing a combined training on the intermediate Deep Neural Net-Hidden Markov Model-sequence training model to obtain the target acoustic model by using a cross-entropy training criterion, a L2-norm training criterion and a Leaky HMM training criterion.

5. A terminal device comprising a memory, a processor, and a computer program stored in the memory and operable on the processor, wherein the processor performs following steps when executing the computer program:

performing feature extraction on a training speech signal to obtain an audio feature sequence;

training the audio feature sequence by a phoneme mixed Gaussian Model-Hidden Markov Model to obtain a phoneme feature sequence; and training the phoneme feature sequence by a Deep Neural Net-Hidden Markov Model-sequence training model to obtain a target acoustic model;

wherein training the audio feature sequence by a phoneme mixed Gaussian Model-Hidden Markov Model to obtain a phoneme feature sequence comprises:

training the audio feature sequence by a monophone Mixture Gaussian Model-Hidden Markov Model to obtain the phoneme feature sequence;

obtaining an original monophone annotation corresponding to each audio feature in the audio feature sequence based on an original monophone Mixture Gaussian Model-Hidden Markov Model;

iteratively training the original monophone Mixture Gaussian Model-Hidden Markov Model based on the audio feature sequence and the original monophone annotation to obtain a target monophone Mixture Gaussian Model-Hidden Markov Model;

aligning each original monophone annotation based on the target monophone Mixture Gaussian Model-Hidden Markov Model to obtain a target monophone feature; and obtaining a phoneme feature sequence based on the target monophone feature.

6. The terminal device according to claim 5, wherein performing feature extraction on a training speech signal comprises:

performing pre-emphasis, framing, windowing, endpoint detection, fast Fourier transform, and Mel filter bank and discrete cosine transform on the training speech signal.

7. The terminal device according to claim 5, wherein training the audio feature sequence by a phoneme mixed Gaussian Model-Hidden Markov Model to obtain a phoneme feature sequence comprises:

training the phoneme feature sequence by a triphone Mixture Gaussian Model-Hidden Markov Model to obtain an updated phoneme feature sequence;

wherein training the phoneme feature sequence by a triphone Mixture Gaussian Model-Hidden Markov Model to obtain an updated phoneme feature sequence comprises:

obtaining an original triphone annotation based on the target monophone feature in the phoneme feature sequence;

inputting the original triphone annotation into the target monophone Mixture Gaussian Model-Hidden Markov Model to obtain an original triphone Mixture Gaussian Model-Hidden Markov Model;

clustering the original triphone Mixture Gaussian Model-Hidden Markov Model to obtain a clustered triphone Mixture Gaussian Model-Hidden Markov Model;

iteratively training the clustered triphone Mixture Gaussian Model-Hidden Markov Model based on the audio feature sequence and the original triphone annotation to obtain a target triphone Mixture Gaussian Model-Hidden Markov Model;

aligning each original triphone annotation based on the target triphone Mixture Gaussian Model-Hidden Markov Model to obtain a target triphone feature;

obtaining the updated phoneme feature sequence based on the target triphone feature.

8. The terminal device according to claim 7, wherein training the phoneme feature sequence by a Deep Neural Net-Hidden Markov Model-sequence training model to obtain a target acoustic model comprises:

training an original Deep Neural Net-Hidden Markov Model-sequence training model with the phoneme feature sequence;

obtaining an original state level annotation corresponding to each target monophone feature or each target triphone feature, based on the original Deep Neural Net-Hidden Markov Model-Sequence Training Model;

training the original Deep Neural Net-Hidden Markov Model-Sequence Training Model based on the audio feature sequence and the original state level annotation to obtain an intermediate Deep Neural Net-Hidden Markov Model-Sequence Training Model; and performing a combined training on the intermediate Deep Neural Net-Hidden Markov Model-sequence training model to obtain the target acoustic model by using a cross-entropy training criterion, a L2-norm training criterion and a Leaky HMM training criterion.

9. A non-transitory computer readable storage medium, the computer readable storage medium stores a computer program, wherein the following steps are performed when the computer program is executed by the processor:

performing feature extraction on a training speech signal to obtain an audio feature sequence;

training the audio feature sequence by a phoneme mixed Gaussian Model-Hidden Markov Model to obtain a phoneme feature sequence; and training the phoneme feature sequence by a Deep Neural Net-Hidden Markov Model-sequence training model to obtain a target acoustic model;

wherein training the audio feature sequence by a phoneme mixed Gaussian Model-Hidden Markov Model to obtain a phoneme feature sequence comprises:

training the audio feature sequence by a monophone Mixture Gaussian Model-Hidden Markov Model to obtain the phoneme feature sequence;

training the original monophone mixed Gaussian Model-Hidden Markov Model by the audio feature sequence obtaining an original monophone annotation corresponding to each audio feature in the audio feature sequence based on an original monophone Mixture Gaussian Model-Hidden Markov Model;

iteratively training the original monophone Mixture Gaussian Model-Hidden Markov Model based on the audio feature sequence and the original monophone annotation to obtain a target monophone Mixture Gaussian Model-Hidden Markov Model;

aligning each original monophone annotation based on the target monophone Mixture Gaussian Model-Hidden Markov Model to obtain a target monophone feature; and obtaining a phoneme feature sequence based on the target monophone feature.

10. The non-transitory computer readable storage medium according to claim 9, wherein performing feature extraction on a training speech signal comprises:

performing pre-emphasis, framing, windowing, endpoint detection, fast Fourier transform, and Mel filter bank and discrete cosine transform on the training speech signal.

11. The non-transitory computer readable storage medium according to claim 9, wherein training the audio feature sequence by a phoneme mixed Gaussian Model-Hidden Markov Model to obtain a phoneme feature sequence comprises:

training the phoneme feature sequence by a triphone Mixture Gaussian Model-Hidden Markov Model to obtain an updated phoneme feature sequence;

wherein training the phoneme feature sequence by a triphone Mixture Gaussian Model-Hidden Markov Model to obtain an updated phoneme feature sequence comprises:

obtaining an original triphone annotation based on the target monophone feature in the phoneme feature sequence;

inputting the original triphone annotation into the target monophone Mixture Gaussian Model-Hidden Markov Model to obtain an original triphone Mixture Gaussian Model-Hidden Markov Model;

clustering the original triphone Mixture Gaussian Model-Hidden Markov Model to obtain a clustered triphone Mixture Gaussian Model-Hidden Markov Model;

iteratively training the clustered triphone Mixture Gaussian Model-Hidden Markov Model based on the audio feature sequence and the original triphone annotation to obtain a target triphone Mixture Gaussian Model-Hidden Markov Model;

aligning each original triphone annotation based on the target triphone Mixture Gaussian Model-Hidden Markov Model to obtain a target triphone feature; and obtaining the updated phoneme feature sequence based on the target triphone feature.

12. The non-transitory computer readable storage medium according to claim 11, wherein training the phoneme feature sequence by a Deep Neural Net-Hidden Markov Model-sequence training model to obtain a target acoustic model comprises:

training an original Deep Neural Net-Hidden Markov Model-sequence training model with the phoneme feature sequence;

obtaining an original state level annotation corresponding to each target monophone feature or each target triphone feature, based on the original Deep Neural Net-Hidden Markov Model-Sequence Training Model;

training the original Deep Neural Net-Hidden Markov Model-Sequence Training Model based on the audio feature sequence and the original state level annotation to obtain an intermediate Deep Neural Net-Hidden Markov Model-Sequence Training Model; and performing a combined training on the intermediate Deep Neural Net-Hidden Markov Model-sequence training model to obtain the target acoustic model by using a cross-entropy training criterion, a L2-norm training criterion and a Leaky HMM training criterion.

\* \* \* \* \*